United States Patent
Terashima et al.

(10) Patent No.: US 8,125,383 B2
(45) Date of Patent: Feb. 28, 2012

(54) POSITIONING METHOD, PROGRAM THEREOF, AND POSITIONING DEVICE

(75) Inventors: Maho Terashima, Nagano (JP); Akira Kimura, Nagano (JP)

(73) Assignee: Seiko Epson Corporation, Tokyo (JP)

(*) Notice: Subject to any disclaimer, the term of this patent is extended or adjusted under 35 U.S.C. 154(b) by 521 days.

(21) Appl. No.: 12/352,091

(22) Filed: Jan. 12, 2009

(65) Prior Publication Data

US 2009/0184873 A1 Jul. 23, 2009

(51) Int. Cl.
*G01S 19/37* (2010.01)
*H04B 1/00* (2006.01)

(52) U.S. Cl. .................................. 342/357.77; 375/150

(58) Field of Classification Search ............. 342/357.75, 342/357.77, 357.25; 375/150
See application file for complete search history.

(56) References Cited

U.S. PATENT DOCUMENTS

| 6,329,946 B1 | 12/2001 | Hirata et al. |
| 6,898,234 B1 * | 5/2005 | Yu et al. ................ 375/149 |

FOREIGN PATENT DOCUMENTS

| JP | H06-088865 A | 3/1994 |
| JP | H07-167936 A | 7/1995 |
| JP | H11-258326 A | 9/1999 |
| JP | 2003-037526 A | 2/2003 |
| JP | 2005-064983 A | 3/2005 |
| JP | 2006-254500 A | 9/2006 |

* cited by examiner

*Primary Examiner* — Gregory C Issing
(74) *Attorney, Agent, or Firm* — Global IP Counselors, LLP (57) ABSTRACT

A positioning method includes (a) adding cumulatively each of an I component and a Q component of a received signal of a positioning signal per polarity, the positioning signal being spread-modulated with a spread code reversed in polarity by a navigation data, (b) calculating sum of squares of the results of the cumulative addition in step (a), (c) executing correlation calculation of the sum of squares calculated in step (b) with a replica code of the spread code, and (d) executing predetermined positioning calculation based on the result of the correlation calculation in step (c) to perform positioning of the present location.

8 Claims, 6 Drawing Sheets

POSITIONING METHOD, PROGRAM THEREOF, AND POSITIONING DEVICE

Japanese Patent Application No. 2008-008723 filed on Jan. 18, 2008, is hereby incorporated by reference in its entirety.

BACKGROUND

1. Technical Field

The present invention relates to a positioning method, a program of the positioning method, and a positioning device.

2. Related Art

The global positioning system (GPS) is widely known as a positioning system utilizing a positioning signal. The GPS is utilized for a position calculation device provided in a portable telephone, a car navigation system, and the like. A GPS receiver locates its current position by calculating four parameters (i.e., three-dimensional coordinate values that indicate the position of the GPS receiver and a clock error) based on information such as the positions of a plurality of GPS satellites and the pseudo-range between each GPS satellite and the GPS receiver (i.e., positioning calculations).

The GPS satellite signal transmitted form the GPS satellite is modulated with a spread code called a PRN code unique to each GPS satellite. Further, it is known that the polarity of the PRN code can be reversed at a 20 millisecond interval by the phase modulation with the navigation data (see e.g., JP-A-11-258326).

In a positioning device of the related art, in order to capture (extract) the GPS satellite signal in a faint received signal, there is generally used a method of cumulatively adding (accumulating) the received signal for a predetermined cumulative addition period, and calculating correlation with a replica code of the PRN code on the signal resulted from the cumulative addition.

However, as described above, the timing at which the polarity of the PRN code is reversed (hereinafter referred to as a "polarity reversal timing") can appear at every 20 millisecond interval (hereinafter referred to as "polarity reversible timing"). Therefore, in the case in which the cumulative addition (cumulative calculation) is executed over a polarity reversible timing and the polarity is reversed at the polarity reversible timing, it may well occur that a signal with different polarities is cumulatively added before and after the timing. If the signal with different polarities is cumulatively added, a part or the whole of the received signal is canceled, which causes a problem of degradation in the receiver sensitivity.

SUMMARY

The invention has an advantage of solving the problem described above.

A positioning method according to a first aspect of the invention includes the steps of (a) cumulatively adding each of an I and Q components of a received signal of a positioning signal per polarity, the positioning signal being spread-modulated with a spread code reversed in polarity by navigation data, (b) calculating sum of squares of the results of the cumulative addition in step (a), (c) executing correlation calculation of the sum of squares calculated in step (b) with a replica code of the spread code, and (d) executing predetermined positioning calculation based on the result of the correlation calculation in step (c) to perform positioning of the present location.

Further, a positioning device according to another aspect of the invention includes a cumulative addition section adapted to add cumulatively each of an I and Q components of a received signal of a positioning signal per polarity, the positioning signal being spread-modulated with a spread code reversed in polarity by a navigation data, a calculation section adapted to calculate sum of squares of the results of the cumulative addition by the cumulative addition section, a correlation calculation section adapted to calculate correlation between the sum of squares calculated by the calculation section and a replica code of the spread code, and a positioning section adapted to execute predetermined positioning calculation based on the result of the correlation calculation by the correlation calculation section to perform positioning of the present location.

According to these aspects of the invention, since it is arranged that each of the I and Q components of the received signal is cumulatively added per polarity, and the correlation calculation is executed on the sum of the squares of the respective results of the cumulative addition, there is no chance that the cancellation of the signal is caused by adding the components of the received signal with the polarities opposite to each other, thus the degradation in the receiver sensitivity can effectively be prevented.

Further, as a second aspect of the invention, the positioning method may include, in addition to the first aspect of the invention, the step of (e) estimating a polarity reversal timing and polarity by comparing time-series data of the received signal with time-series data of the navigation data of the positioning signal and determining a matching part of the polarity reversal timing in the navigation data and, in step (a), each of the I component and the Q component of the received signal is cumulatively added per polarity in accordance with the estimated polarity reversal timing and the polarity.

According to the second aspect of the invention, by the so-called pattern matching processing using the time-series data of the received signal as the judgment object data and the time-series data of the navigation data of the positioning signal as the reference data, it becomes possible to easily estimate the polarity reversal timing and the polarity of the received signal.

Further, as a third aspect of the invention, the positioning method may include, in addition to the first aspect of the invention, the steps of (f) selecting a common data part common to the navigation data of different positioning signals, and (g) estimating a polarity reversal timing and the polarity by comparing time-series data of the received signal with the common data and determining a matching part of the polarity reversal timing in the common data, and, in step (a), each of the I component and the Q component of the received signal is cumulatively added per polarity in accordance with the estimated polarity reversal timing and polarity.

The navigation data of the GPS satellite signal includes the data such as almanac, ephemeris, an ionospheric correction parameter, or Coordinated Universal Time (UTC) information. Among the data, the almanac, the ionospheric correction parameter, and the UTC information, for example, are the data common to all of the GPS satellite signals. According to the third aspect of the invention, it becomes possible to estimate the polarity reversal timing and the polarity of the received signal by the pattern matching processing using the common data part of the navigation data as the reference data.

Further, as a fourth aspect of the invention, the positioning method may include, in addition to the first aspect of the invention, the steps of (h) estimating, in the case in which the navigation data corresponding to the positioning signal has been acquired, a polarity reversal timing and polarity by comparing time-series data of the received signal with time-series data of the navigation data of the positioning signal and determining a matching part of the polarity reversal timing in the navigation data, (f) selecting a common data part common to the navigation data of different positioning signals, and (i) estimating, in the case in which the navigation data corresponding to the positioning signal has not been acquired, a polarity reversal timing and polarity by comparing time-series data of the received signal with the common data and determining a matching part of the polarity reversal timing in the common data, and, in step (a), each of the I component and the Q component of the received signal is cumulatively added per polarity in accordance with the estimated polarity reversal timing and polarity.

According to the fourth aspect of the invention, in the case in which the navigation data corresponding to the positioning signal has been acquired, the pattern matching processing using the time-series data of the navigation data of the positioning signal as the reference data is executed, while in the case in which the navigation data corresponding to the positioning signal has not been acquired, the pattern matching processing using the common data part of the navigation data as the reference data is executed. According to such a configuration, it becomes possible to estimate the polarity reversal timing and the polarity of the received signal regardless of whether or not the navigation data has been acquired.

Further, as a fifth aspect of the invention, the positioning method may include, in addition to any one of the second through fourth aspects of the invention, the step of (j) adding cumulatively each of the I component and the Q component regardless of the polarity, and in the case in which the estimation of the polarity reversal timing is unsuccessful in step (e), step (j) is executed instead of step (a).

According to the fifth aspect of the invention, even in the case in which the estimation of the polarity reversal timing is unsuccessful, it enables to calculate correlation with the replica code of the spread code by cumulatively adding each of the I and Q component of the received signal.

Further, as a sixth aspect of the invention, in addition to the positioning method in the fifth aspect of the invention, wherein in the case in which the estimation of the polarity reversal timing is successful in step (e), step (a) is executed for a first cumulative addition time, and in the case in which the estimation of the polarity reversal timing is unsuccessful in step (e), step (j) is executed for a second cumulative addition time shorter than the first cumulative addition time.

In the case in which the estimation of the polarity reversal timing is successful, it enables to cumulatively add the received signal for a long period of time regardless of the time interval of the appearance of the polarity reversal timing, thus the receiver sensitivity can further be enhanced. On the other hand, in the case in which the estimation of the polarity reversal timing is not successful, the cumulative addition for a period exceeding the time interval of the appearance of the polarity reversal timing may cause degradation in the receiver sensitivity. In order to prevent the degradation in the receiver sensitivity, it is necessary to execute the cumulative addition for a period shorter than the time interval of the appearance of the polarity reversal timing in the case in which the estimation of the polarity reversal timing is unsuccessful.

Further, as a seventh aspect of the invention, it is also possible to configure a computer-readable medium storing a program that makes a computer incorporated in a positioning device to execute the positioning method of any one of the first through 6 aspect of the invention.

BRIEF DESCRIPTION OF THE DRAWINGS

The invention will now be described with reference to the accompanying drawings, wherein like numbers refer to like elements.

DESCRIPTION OF EXEMPLARY EMBODIMENTS

Hereinafter, an example of a preferred embodiment of the invention will be described with reference to the accompanying drawings. It should be noted that although a portable telephone will be exemplified as an electronic apparatus equipped with a positioning device, and the case in which the GPS is used as the positioning system will be explained, the embodiment to which the invention can be applied is not limited thereto.

1. FUNCTIONAL CONFIGURATION

Figure 1:
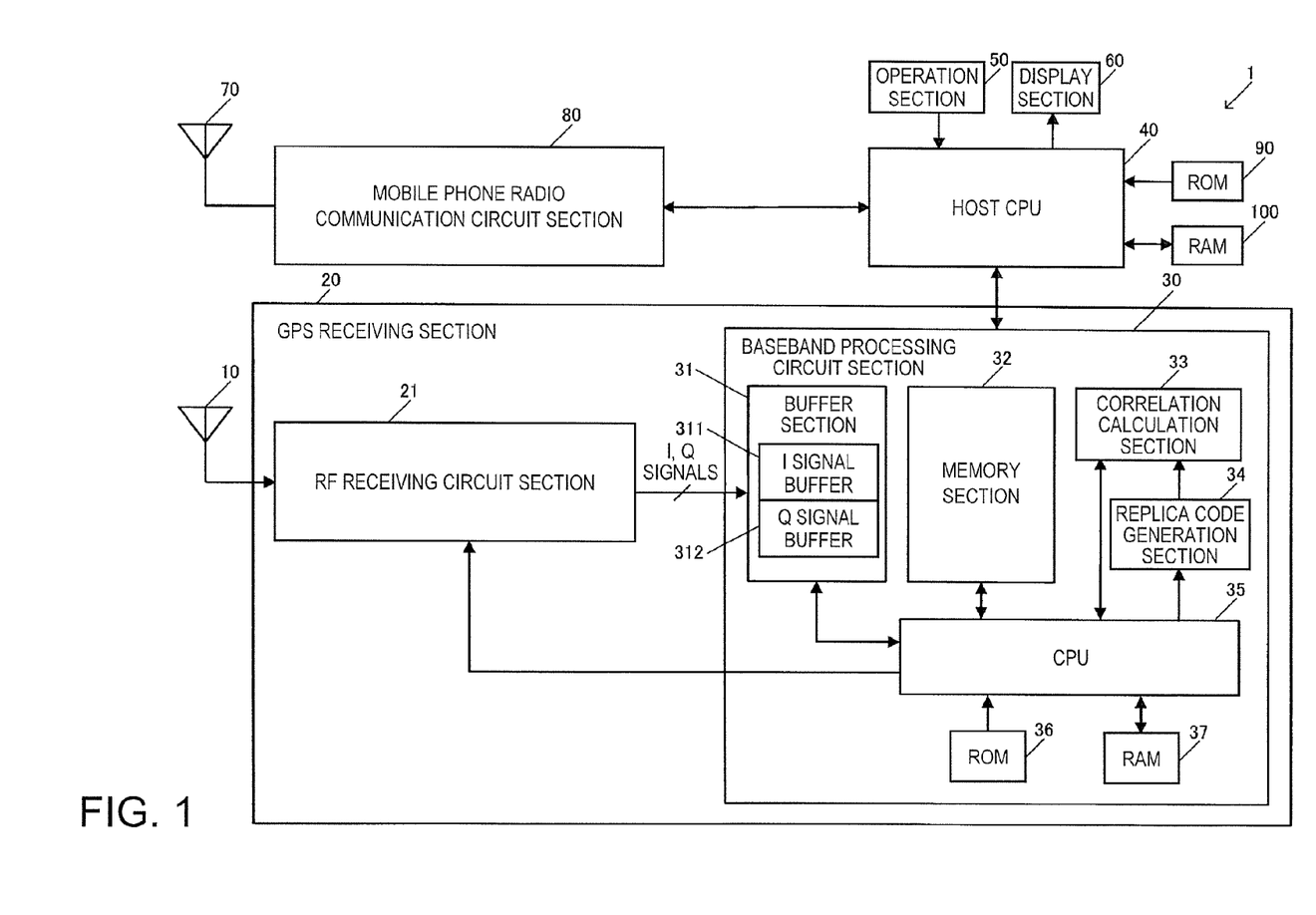
FIG. 1 is a block diagram showing a functional configuration of a portable phone.

FIG. 1 is a block diagram showing a functional configuration of the portable phone 1 as an embodiment according to the invention. The portable phone 1 is comprised of a GPS antenna 10, a GPS receiving section 20, a host central processing unit (CPU) 40, an operation section 50, a display section 60, a mobile phone antenna 70, a mobile phone radio communication circuit section 80, a read only memory (ROM) 90, and a random access memory (RAM) 100.

The GPS antenna 10 is an antenna for receiving radio frequency (RF) signals including the GPS satellite signal transmitted from GPS satellites, and outputs the received signals to the GPS receiving section 20. It should be noted that the GPS satellite signal is a communication signal of 1.57542 [GHz] modulated by the direct sequence spread spectrum method with the pseudo random noise (PRN) code, which is a type of a spread code unique to each of the satellites. The PRN code is a pseudo random code having a code length of 1023 chips as 1 PN frame, and a repetition period of 1 ms.

The GPS receiving section 20 is a positioning circuit for positioning the present location of the portable phone 1 based on the signal output from the GPS antenna 10, and a functional block corresponding to a so-called GPS receiver. The GPS receiving section 20 is comprised of an RF receiving circuit section 21, and a baseband processing circuit section 30. It should be noted that the RF receiving circuit section 21 and the baseband processing circuit section 30 can be manufactured separately as discrete large scale integration circuits (LSI), or manufactured integrally as one chip.

The RF receiving circuit section 21 is a receiving circuit block for radio frequency signals (RF signals) that divides or multiplies a predetermined oscillation signal to generate an oscillation signal for RF signal multiplication. Further, the RF receiving circuit section 21 multiplies the oscillation signal for RS signal multiplication by the RF signal received by the GPS antenna 10 to down-convert the RF signal into a an intermediate frequency signal (hereinafter referred to as "IF signal"). IF signal is then amplified and converted into a digital signal in an A/D converter to be outputted to the baseband processing circuit section 30.

Specifically, the RF receiving circuit section 21 is a receiving system for receiving signal using a so-called superheterodyne method. Further, although the detailed circuit configuration is not shown in the drawings, the RF receiving circuit section 21 multiplies the oscillation signal and a signal having a phase 90 degrees shifted from the oscillation signal by the RF signal, thereby obtaining the IF signal separated into an inphase component (I component) signal and a quadrature component (Q component) signal (I signal and Q signal), further executes the A/D conversion on each of the I component and the Q component, and outputs the result to the baseband processing circuit section 30.

The baseband processing circuit section 30 is a circuit section for executing correlation processing or the like on the IF signal output from the RF receiving circuit section 21 to capture and extract the GPS satellite signal, and decoding the data to perform the positioning calculation. The baseband processing circuit section 30 is comprised of a buffer section 31, a memory section 32, a correlation calculation section 33, a replica code generation section 34, a CPU 35, a ROM 36, and a RAM 37. It should be noted that although the explanation will be made assuming that the CPU 35 executes the positioning calculation of the present location itself in the present embodiment, it is obvious that it can also be assumed that the host CPU 40 executes the positioning calculation of the present location.

The buffer section 31 is a buffer for cumulatively storing the I and Q signals of the received signal, which are input from the RF receiving circuit section 21, in time-series order in accordance with the control signal of the CPU 35. The buffer section 31 is comprised of an I signal buffer 311 for storing time-series data of the I signal and a Q signal buffer 312 for storing time-series data of the Q signal.

The memory section 32 is a memory used when the CPU 35 executes cumulative addition on each of the time-series data of the respective I and Q signals stored in the buffer section 31. The CPU 35 dynamically allocates storage area for the I and Q signals in the memory section 32 to execute the cumulative addition on the I and Q signals in accordance with success and failure of estimation of the polarity reversal timing of the I and Q signals by a polarity reversal timing estimation processing described later.

Specifically, if the estimation of the polarity reversal timing has been successful, the CPU 35 cumulatively adds each of the I and Q signals cumulatively stored in the buffer section 31 until a first cumulative addition time (e.g., "200 milliseconds") elapses in accordance with the polarity reversal timing and the polarity of each of the I and Q signals (the received signals) thus estimated. On this occasion, the CPU allocates four storage areas in the memory section 32 respectively for the positive I signal, the negative I signal, the positive Q signal, and the negative Q signal (hereinafter referred to as "I+ signal," "I− signal," "Q+ signal," and "Q− signal," respectively), and executes the cumulative addition on the corresponding signals in the respective storage areas.

On the other hand, if the estimation of the polarity reversal timing is unsuccessful, the CPU 35 cumulatively adds each of the I and Q signals, which are cumulatively stored in the buffer section 31, until a second cumulative addition time (e.g., "10 milliseconds") elapses. On this occasion, the CPU 35 allocates two storage areas in the memory section 32 respectively for the I signal and the Q signal, and executes the cumulative addition on the corresponding signals in the respective storage areas.

If the estimation of the polarity reversal timing has been successful, since each of the I and Q signals can be cumulatively added separately for respective polarities, even if each of the signals is cumulatively added for a long period of time, there is no chance that the cancellation of the signal is caused by adding the components of the received signal with polarities opposite to each other. However, if the estimation of the polarity reversal timing is unsuccessful, it is not achievable to cumulatively add each of the I and Q signals separately for the respective polarities, and therefore, if the signal is cumulatively added for a period of time longer than a time interval of the polarity reversal timing, there is a possibility of canceling the a part or the whole of the signal by adding the components of the received signal with the polarities opposite to each other. Therefore, the second cumulative addition time is required to be shorter than the first cumulative addition time, preferably "20 milliseconds" or less, which is the time interval of the polarity reversible timing of the navigation data.

The correlation calculation section 33 is a circuit section for calculating the correlation between the signal obtained as the sum of squares of the respective signals obtained by the cumulative addition in each of the storage areas allocated by the CPU 35 in the memory section 32 and the replica code generated by the replica code generation section 34. Specifically, the correlation calculation section 33 calculates the correlation between the obtained sum-of-squares signal and the replica code while shifting the phase of the replica code (the code phase), and outputs the correlation values in the respective code phases to the CPU 35.

The replica code generation section 34 generates the replica code simulating the PRN code of the GPS satellite (hereinafter referred to as "capturing object satellite") of the capturing object in accordance with the control signal from the CPU 35, and outputs the replica code thus generated to the correlation calculation section 33.

The CPU 35 is a processor for executing a predetermined positioning calculation to perform positioning of the present location of the portable phone 1. Specifically, the CPU 35 detects the PRN code and the code phase included in the GPS satellite signal to capture and track the GPS satellite signal based on the correlation values output from the correlation calculation section 33. Subsequently, the CPU 35 decodes the data of the acquired and tracked GPS satellite signal, calculates the pseudo range and position based on the orbital information, the time information, and so on of the GPS satellite, thereby positioning the present location of the portable phone 1.

Figure 2:
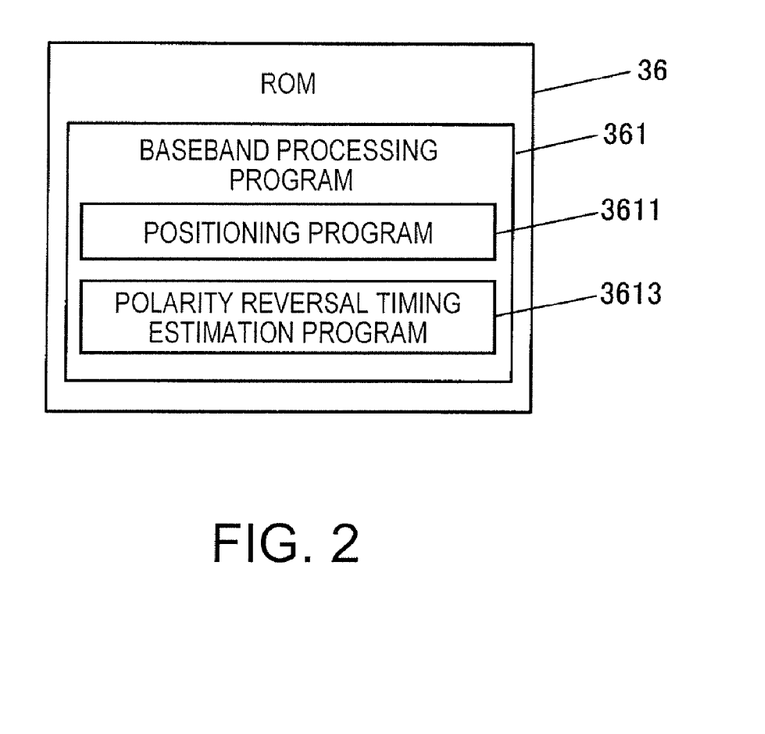
FIG. 2 is a diagram showing an example of data stored in a ROM.

FIG. 2 is a diagram showing an example of the data stored in the ROM 36. The ROM 36 stores a baseband processing program 361 retrieved by the CPU 35 and executed as the baseband processing (see FIG. 5). Further, the baseband processing program 361 includes the positioning program 3611 executed as the positioning processing (see FIGS. 6 and 7), and the polarity reversal timing estimation program 3613 executed as the polarity reversal timing estimation processing (see FIG. 8) as subroutines.

The positioning processing is the processing by the CPU 35 for executing a predetermined positioning calculation to perform positioning of the present location of the portable phone 1. More specifically, for each of the capturing object satellites, the CPU 35 dynamically allocates the storage areas in the memory section 32 to execute cumulative addition on each of the I and Q signals based on the result of the estimation of the polarity reversal timing, and outputs the signal of the sum of squares of the signals, which is obtained by the cumulative addition, to the correlation calculating section 33. Subsequently, based on the result of the correlation calculation by the correlation calculation section 33, the CPU 35 judges whether the capturing of each of the capturing object satellites has been successful or unsuccessful, and executes predetermined positioning calculation using the information of the pseudo ranges of the satellites captured successfully (hereinafter referred to as "captured satellites"), thereby positioning the present location of the portable phone 1.

The polarity reversal timing estimation processing is the processing by the CPU 35 for estimating the polarity reversal timing and the polarity of the received signal for each of the capturing object satellites. More specifically, in the case in which the navigation data of the GPS satellite signal of the present capturing object satellite has already been acquired, so-called pattern matching processing, which uses the time-series data of the received signal cumulatively stored in the buffer section 31 as the judgment object data and the time-series data of the navigation data thus acquired as the reference data, is executed, and the polarity reversal timing and the polarity of the received signal are estimated based on the result of the pattern matching processing.

On the other hand, if the navigation data of the present capturing object satellite has not yet been acquired, a common data part having the common data content is selected from the navigation data, which has already been acquired. Then, the pattern matching processing, which uses the received signal cumulatively stored in the buffer section 31 as the judgment object data, and the common data part as the reference data, is executed, and the polarity reversal timing and the polarity of the received signal are estimated based on the result of the pattern matching. The baseband processing, the positioning processing, and the polarity reversal timing estimation processing will be described later in detail using the respective flowcharts.

Figure 3:
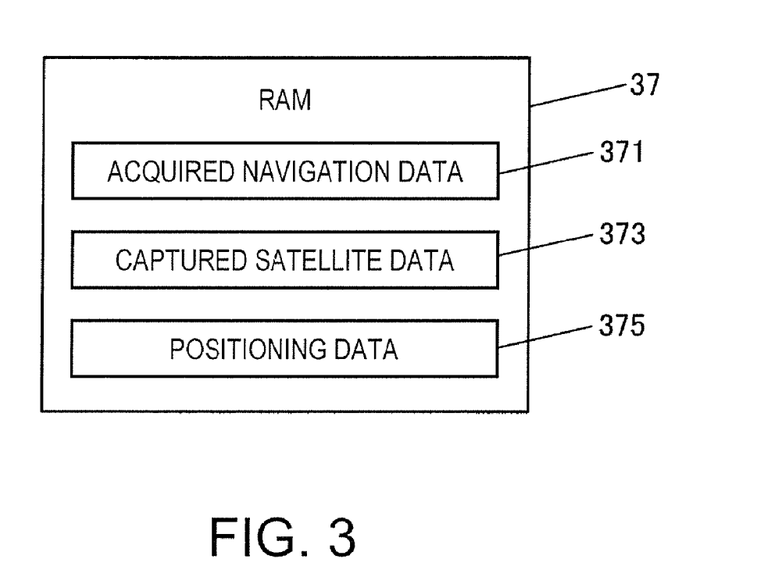
FIG. 3 is a diagram showing an example of data stored in a RAM.

FIG. 3 is a diagram showing an example of the data to be stored in the RAM 37. The RAM 37 stores acquired navigation data 371, captured satellite data 373, and positioning data 375.

Figure 4:
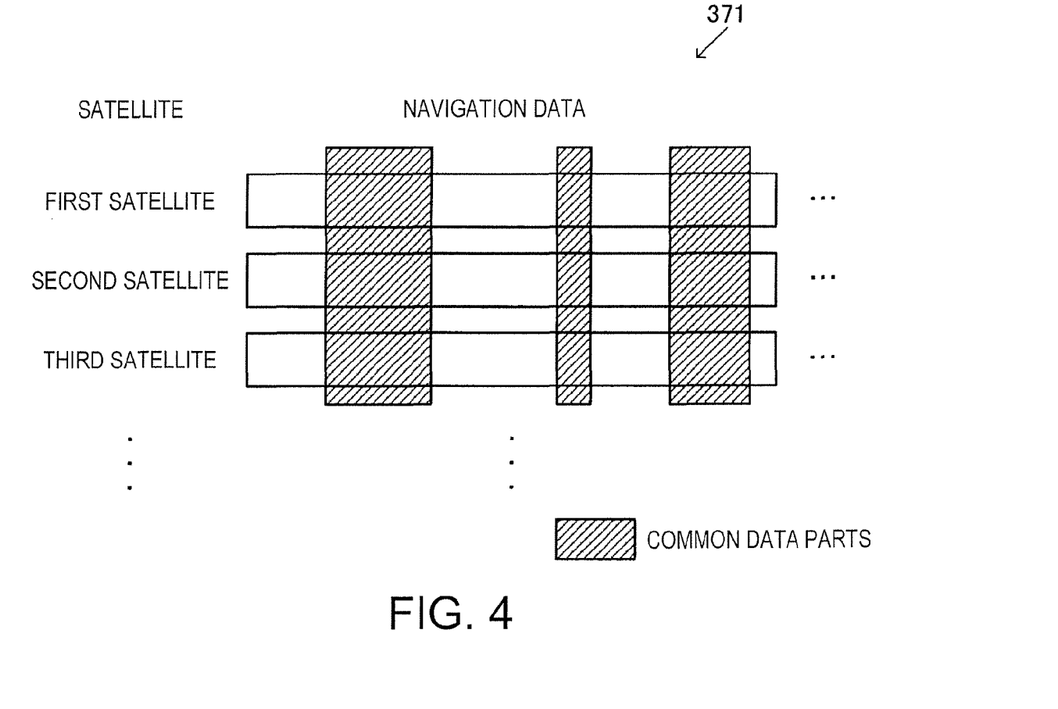
FIG. 4 is an explanatory diagram of the data content of the acquired navigation data.

FIG. 4 is a diagram for explaining the data content of the acquired navigation data 371. In the area of the acquired navigation data 371, the acquired navigation data is stored in correspondence with the numbers of the GPS satellites.

The navigation data is a signal having 20 cycles of PRN code (=20 PN frames) as 1 bit, and includes the data such as almanac, ephemeris, an ionospheric correction parameter, and Coordinated Universal Time (UTC) information. Among the data, the almanac, the ionospheric correction parameter, and the UTC information, for example, are common to all of the GPS satellites. Such a part of the navigation data having the content common thereto is referred to as "a common data part." In FIG. 4, in order for explaining the concept of the common data parts, the areas corresponding to the common data parts are provided with hatching.

It is possible to adopt the configuration in which the mobile phone radio communication circuit section 80 is made to perform the communication (hereinafter referred to as "the base station communication") with a base station to receive the navigation data of all of the GPS satellites when, for example, starting the positioning, and thus acquiring the navigation data. It should be noted that it is also possible to receive the navigation data of only the satellites (supposed visible satellites), which are supposedly located in the sky above the portable phone 1, instead of receiving the navigation data of all of the GPS satellites.

Further, it is also possible to adopt the configuration of decoding the navigation data internally in the portable phone 1 as the acquired navigation data instead of acquiring the navigation data by the base station communication. Specifically, it is possible to store the navigation data acquired by decoding the GPS satellite signal (captured satellite signal) of the captured satellite in the area of the acquired navigation data 371 as the acquired navigation data so as to correspond to the number of the present captured satellite.

The captured satellite data 373 is the data containing the numbers of the captured satellites, and is updated by the CPU 35 in the baseband processing.

The positioning data 375 is the data containing the calculated location obtained by the positioning calculation, and is updated by the CPU 35 in the baseband processing.

The host CPU 40 is a processor for integrally controlling each of the sections of the portable phone 1 along various kinds of programs such as a system program stored in the ROM 90. The host CPU 40 makes the display section 60 display the navigation information with the plotted calculated location input from the CPU 35.

The operation section 50 is an input device composed, for example, of a touch panel and button switches, and outputs to the host CPU 40 the signals corresponding to the keys and buttons held down. By operating the operation section 50, various kinds of instruction inputs such as a call request, or transmission or receiving request of an electronic mail are executed.

The display section 60 is a display device composed of a liquid crystal display (LCD) or the like, and executing various types of display based on the display signal input from the host CPU 40. On the display section 60, the navigation screen, the time information, and so on are displayed.

The mobile phone antenna 70 is an antenna for performing transmission and reception of the mobile phone radio communication signal with the wireless base stations installed by the communication service company of the portable phone 1.

The mobile phone radio communication circuit section 80 is a communication circuit section of the mobile phone mainly composed of an RF conversion circuit, a baseband processing circuit, and so on, and executes modulation and demodulation on the mobile phone radio signal, thereby realizing phone calls, transmission and reception of the electronic mails, and so on.

The ROM 90 stores a system program for the host CPU 40 to control the portable phone 1, various programs and data for the host CPU 40 to realizing the navigation function, and so on.

The RAM 100 forms a work area for temporarily storing the system program, various types of processing programs executed by the host CPU 40, and in-process data and process results of the various types of processing.

2. FLOW OF PROCESSING

Figure 5:
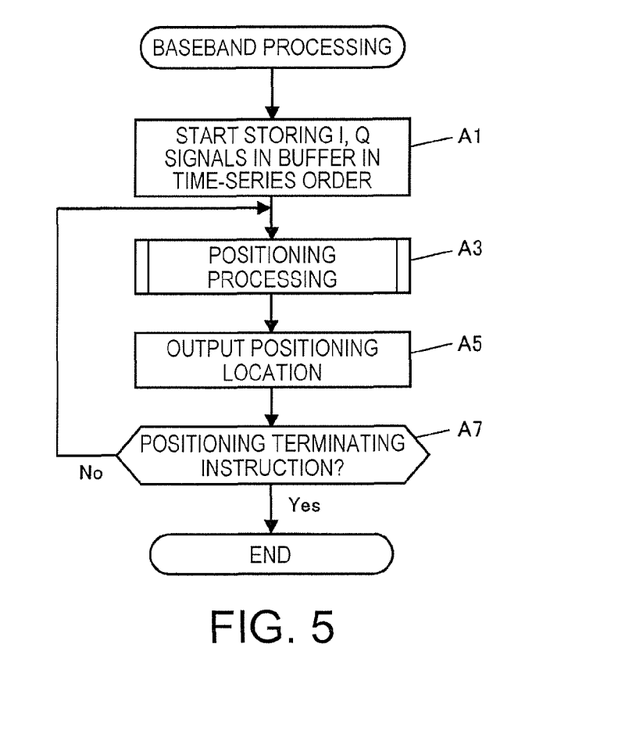
FIG. 5 is a flowchart showing the flow of the baseband processing.

FIG. 5 is a flowchart showing the flow of the baseband processing corresponding to the baseband processing program 361 stored in the ROM 36, then retrieved therefrom by the CPU 35, and executed by the CPU 35 in the portable phone 1.

The baseband processing is the processing the execution of which is started by the CPU 35 in conjunction with the reception of the GPS satellite signal by the RF receiving circuit section 21 when the CPU 35 detects that the operation of the positioning start instruction is executed on the operation section 50, which is the processing executed in parallel to various types of processing such as execution of the various application programs. It should be noted that it is also possible to arrange that powering ON and OFF of the portable phone 1 and starting and stopping of the GPS receiving section 20 including the RF receiving circuit section 21 are respectively coupled to each other, and the execution of the process is started when the power ON operation of the portable phone 1 is detected.

Further, although not specifically explained, it is assumed that while the baseband processing described below is in progress, there is created the state in which reception of the RF signal by the GPS antenna 10 and the down-conversion into the IF signal and the I-Q separation of the signal by the RF receiving circuit section 21 are executed, and the I and Q signals of the received signal are output to the baseband processing circuit section 30 as needed.

Firstly, the CPU 35 cumulatively stores the I and Q signals of the received signal, which are output from the RF receiving circuit section 21, in the I signal buffer 311 and the Q signal buffer 312 of the buffer section 31, respectively, in the time-series order (step A1). Then, the CPU 35 retrieves the positioning program 3611 stored in the ROM 36 to execute the program, thus performing the positioning processing (step A3).

Figure 6:
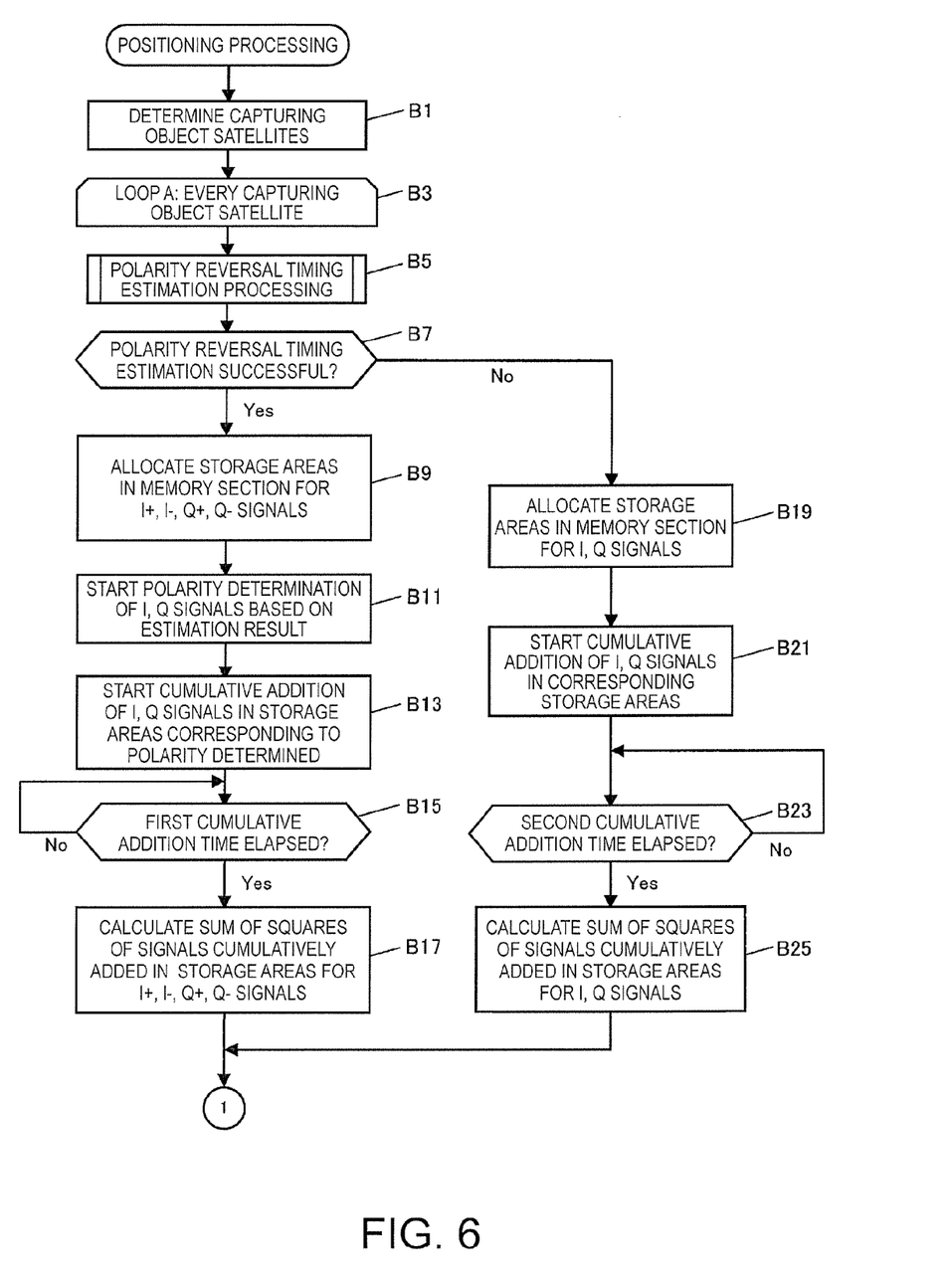
FIG. 6 is a flowchart showing the flow of the positioning processing.
Figure 7:
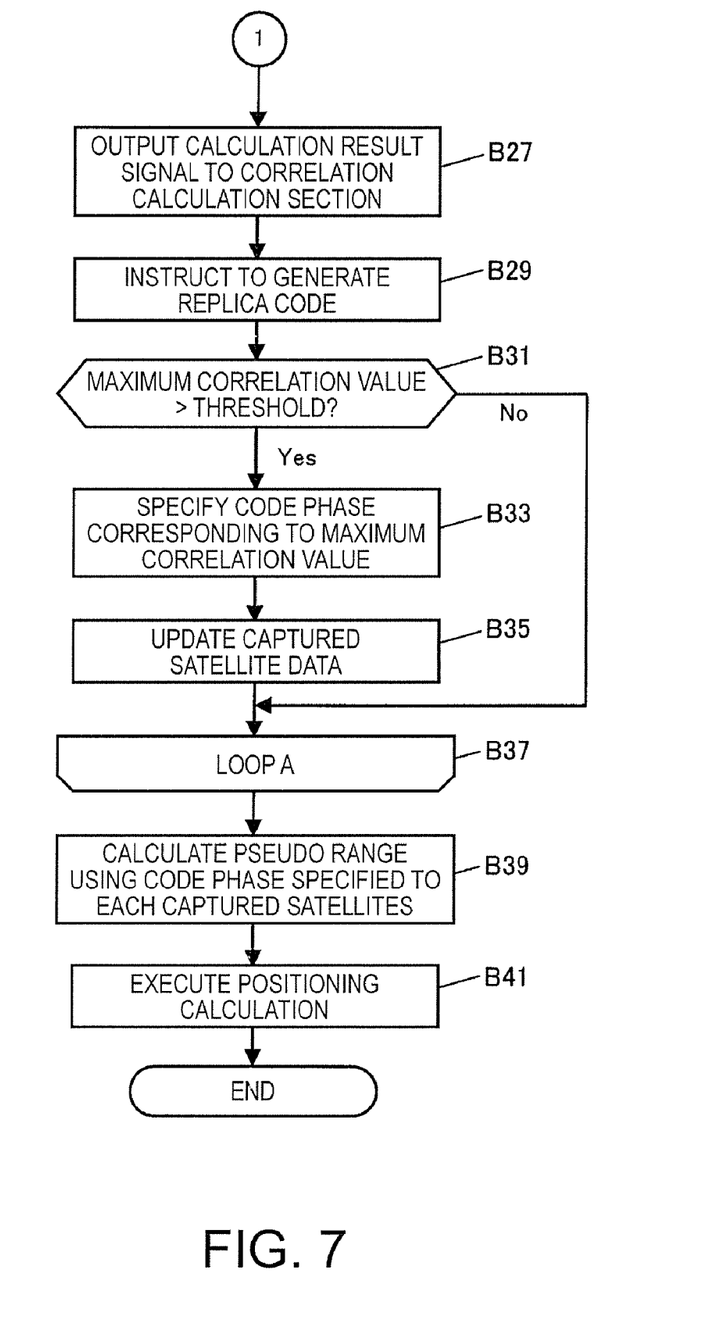
FIG. 7 is a flowchart showing the flow of the positioning processing.

FIGS. 6 and 7 are flowcharts showing the flow of the positioning processing.

Firstly, the CPU 35 determines the capturing object satellites based on the data such as almanac of the acquired navigation data stored in the area of the acquired navigation data 371 of the RAM 37 (step B1). Then, the CPU 35 executes the process corresponding to the loop A (steps B3 through B37) for each of the capturing object satellites. In the loop A, the CPU 35 retrieves the polarity reversal timing estimation program 3613 stored in the ROM 36 and executes the program, thereby performing the polarity reversal timing estimation processing (step B5).

Figure 8:
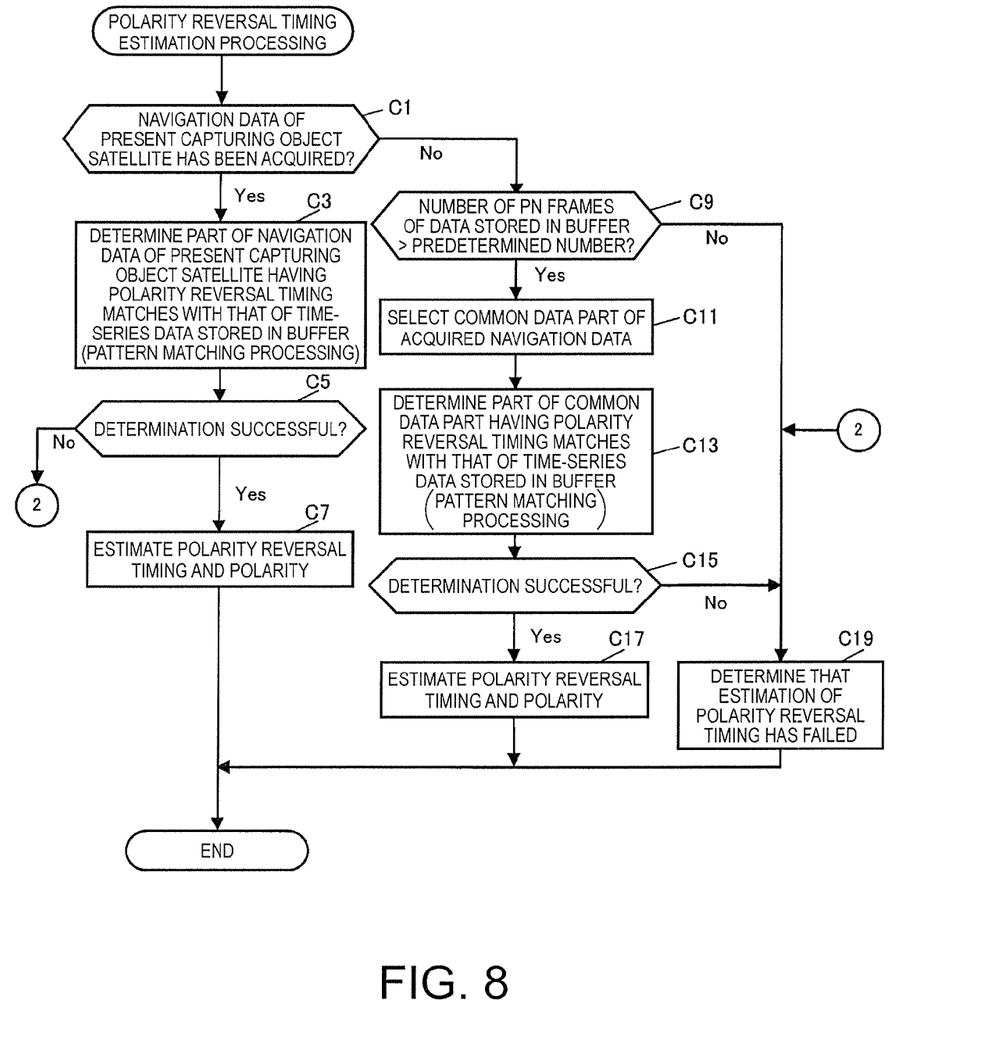
FIG. 8 is a flowchart showing the flow of the polarity reversal timing estimation processing.

FIG. 8 is a flowchart showing the flow of the polarity reversal timing estimation processing.

Firstly, the CPU 35 looks up the acquired navigation data 371 of the RAM 37, and judges whether or not the navigation data of the present capturing object satellite has been acquired (step C1). Then, if it is determined that the acquisition has been done (Yes in the step C1), the CPU 35 executes the processing (the pattern matching processing) for comparing the I and Q signals stored in the buffer section 31 with the time-series data of the navigation data of the present capturing object satellite stored in the area of the acquired navigation data 371 to determine the part of the navigation data in which the polarity reversal timing matches (step C3).

Subsequently, the CPU 35 judges whether or not the determination of the matching part is successful (step C5), and if it is successful (Yes in the step C5), the CPU 35 estimates the polarity reversal timing and the polarity of the received signal expected to be received thereafter based on the polarity reversal timing and the polarity thereof in the part of the data on and after the matching part in the navigation data (step C7). Then, the CPU 35 terminates the polarity reversal timing estimation processing.

Further, if it is determined in the step C1 that the navigation data of the present capturing object satellite has not been acquired (No in the step C1), the CPU 35 judges whether or not the number of PN frames of the I and Q signals stored in the buffer section 31 exceeds a predetermined number (e.g., "200") (step C9). Then, if it is determined that it exceeds the predetermined number (Yes in the step C9), the CPU 35 selects the common data part of the acquired navigation data stored in the area of the acquired navigation data 371 (step C11).

Subsequently, the CPU 35 performs the processing (the pattern matching processing) of comparing the time-series data of the I and Q signals stored in the buffer section 31 with the common data part to determine the part in the common data part in which the polarity reversal timing matches (step C13). Subsequently, the CPU 35 judges whether or not the determination of the matching part is successful (step C15), and if it is successful (Yes in the step C15), the CPU 35 estimates the polarity reversal timing and the polarity of the received signal expected to be received thereafter based on the polarity reversal timing and the polarity thereof in the part of the data on and after the matching part in the common data part (step C17).

It should be noted that since the navigation data of the capturing object satellite has not yet been acquired, the polarity reversal timing and the polarity thereof in the data part (the non-common data part) after the common data in the navigation data remain unknown. Therefore, the polarity reversal timing and the polarity of the received signal allowed for the CPU 35 to estimate in the step C17 is limited to the polarity reversal timing and the polarity of the part of the received signal corresponding to the common data part of the navigation data. After estimating the polarity reversal timing, the CPU 35 terminates the polarity reversal timing estimation processing.

On the other hand, if the CPU determines in the step C9 that the number of PN frames of the data stored in the buffer section 31 is equal to or smaller than the predetermined number (No in the step C9), the CPU 35 determines that the estimation of the polarity reversal timing of the received signal is unsuccessful (step C19). Further, if it is determined in the step C5 or the step C15 that the determination of the matching part is unsuccessful (No in the step C5 or step C15), it is also determined that the estimation of the polarity reversal timing of the received signal is unsuccessful (step C19). Then, the CPU 35 terminates the polarity reversal timing estimation processing.

Going back to the positioning processing shown in FIG. 6, after executing the polarity reversal timing estimation processing, the CPU 35 judges whether or not the estimation of the polarity reversal timing has been successful (step B7), and if the estimation is determined to be successful (Yes in the step B7), the CPU allocates the storage areas for the I+ signal, the I− signal, the Q+ signal, and the Q− signal, respectively, in the memory section 32 (step B9).

Subsequently, the CPU 35 starts the determination of the polarity of each of the I and Q signals based on the result of the estimation of the polarity reversal timing (step B11). Further, the CPU 35 starts the processing of cumulatively adding each of the I and Q signals, which are stored in the buffer section 31, respectively to the storage areas corresponding to the polarity thus determined (step B13).

Subsequently, the CPU 35 executes the polarity determination and the cumulative addition on each of the I and Q signals until the first cumulative addition time (e.g., "200 milliseconds") elapses, and if it is determined that the first cumulative addition time has elapsed (Yes in the step B15), the sum of squares of the signals cumulatively added in the storage areas for the I+ signal, the I− signal, the Q+ signal, and the Q− signal, respectively, allocated in the memory section 32 is calculated (step B17).

On the other hand, if it is determined in the step B7 that the estimation of the polarity reversal timing is unsuccessful (No in the step B7), the CPU 35 allocates the storage areas for the I signal and the Q signal, respectively in the memory section 32 (step B19). Further, the CPU 35 starts the processing of cumulatively adding each of the I and Q signals, which are stored in the buffer section 31, in the corresponding storage areas (step B21).

Subsequently, the CPU 35 executes the cumulative addition on each of the I and Q signals until the second cumulative addition time (e.g., "10 milliseconds") elapses. Then, if it is determined that the second cumulative addition time has elapsed (Yes in the step B23), the CPU 35 calculates the sum of squares of the signals cumulatively added in the storage areas for the I signal and the Q signal, respectively, allocated in the memory section 32 (step B25).

After calculating the sum of squares of the signals in the step B17 or B25, the CPU 35 outputs the signal of the calculation result to the correlation calculation section 33 (step B27). Further, the CPU 35 provides the replica code generation section 34 with the instruction of generating the replica code of the PRN code unique to the present capturing object satellite (step B29).

Further, the CPU 35 determines whether or not the maximum correlation value, which is the maximum value of the correlation values output from the correlation calculation section 33, exceeds a predetermined threshold value (step B31). Then, if it is determined that the maximum correlation value is equal to or smaller than the threshold value (No in the step B31), the CPU 35 determines that the capturing of the present capturing object satellite is unsuccessful, and moves the processing to the next capturing object satellite.

Further, if it is determined that the maximum correlation value has exceeded the threshold value (Yes in the step B31), the CPU 35 specifies the code phase corresponding to the maximum correlation value (step B33). Further, the CPU 35 adds the present capturing object satellite to the captured satellites, updates the captured satellite data 373 (step B35), and then moves the processing to the next capturing object satellite.

After executing the processing of the steps B5 through B35 for all of the capturing object satellites, the CPU 35 terminates the processing of the loop A. Subsequently, with respect to each of the captured satellites stored in the captured satellite data 373 of the RAM 37, the CPU 35 calculates the pseudo range from the captured satellite to the portable phone 1 using the code phase thus specified (step B39).

Subsequently, the CPU 35 executes the positioning calculation using, for example, the least-squares method or the Kalman filter, using the pseudo ranges calculated for the plurality of captured satellites to perform (step B41) positioning of the present location of the portable phone 1, and stores the calculated location in the positioning data 375 of the RAM 37. It should be noted that since a method known to the public can be applied to the positioning calculation using the least-squares method or the Kalman filter, detailed explanations therefore will be omitted here. Then, the CPU 35 terminates the positioning processing.

Going back to the baseband processing shown in FIG. 5, after executing the positioning processing, the CPU 35 outputs the calculated location stored in the positioning data 375 of the RAM 37 to the host CPU 40 (step A5). Then, the CPU determines whether or not the user provides the positioning termination instruction to the operation section 50 (step A7), if it is determined that no such instruction has been provided (No in the step A7), the CPU 35 returns the processing to the step A3. Further, if it is determined that the positioning termination instruction has been provided (Yes in the step A7), the CPU 35 terminates the baseband processing.

3. FUNCTIONS AND ADVANTAGES

According to the present embodiment, since it is arranged that each of the I and Q components of the received signal is cumulatively added separately by the polarity, and the correlation calculation is executed on the sum of the squares of the respective results of the cumulative addition, there is no chance that the cancellation of the signal is caused by adding the components of the received signal with the polarities opposite to each other, thus the degradation in the receiver sensitivity can effectively be prevented.

Further, in the present embodiment, it is arranged that in the case in which the navigation data of the capturing object satellite has already been acquired, the pattern matching processing using the time-series data of the acquired navigation data as reference data is used to determine the part in which the reference data and the time-series data of the received signal match with each other, and in the case in which the navigation data of the capturing object satellite has not been acquired, the pattern matching processing using the common data part of the navigation data as reference data is used to determine the part in which the reference data and the time-series data of the received signal match with each other. According to such a configuration, it becomes possible to estimate the polarity reversal timing and the polarity of the received signal regardless of whether or not the navigation data has been acquired.

4. MODIFIED EXAMPLES 4-1. Electronic Apparatus

The invention can be applied to any electronic apparatus providing the electronic apparatus is equipped with a positioning device. For example, the invention can be applied to a laptop personal computer, a personal digital assistant (PDA), a vehicle navigation device, and so on in a similar manner.

4-2. Satellite Positioning System

In the embodiment described above, although the explanations are presented exemplifying the GPS as the satellite positioning system, other satellite positioning systems such as Wide Area Augmentation System (WAAS), Quasi Zenith Satellite System (QZSS), GLObal NAvigation Satellite System (GLONASS), or GALILEO can also be adopted.

4-3. Split Processing

It is possible to arrange that the host CPU 40 executes a part or the whole of the processing to be executed by the CPU 35. For example, it is possible to arrange that the host CPU 40 executes the polarity reversal timing estimation processing, and the CPU 35 executes the positioning calculation based on the estimation result. Alternatively, it is also possible to arrange that the host CPU 40 executes the whole processing, of which the CPU 35 is in charge, including the positioning calculation.

4-4. Correlation Calculation Processing

Although in the embodiment described above, the explanations are presented assuming that the correlation calculation section 33 is separately provided to the baseband processing circuit section 30 to realize the correlation calculation between the sum of squares of the results of the cumulative addition of the received signal and the replica code with hardware, it is also possible to arrange that the correlation calculation processing is realized with software by adopting the configuration in which the CPU 35 executes the correlation calculation processing.

4-5. Combination of Results of Cumulative Addition

Further, although in the embodiment described above, the explanations are presented assuming that the sum of squares of the results of the cumulative addition of the received signal is calculated to execute the correlation calculation with the replica code, it is possible to arrange that the sum of biquadrates or the sum of sextuplicates of the results of the cumulative addition of the received signal is calculated to execute the correlation calculation with the replica code instead of the sum of squares of the results of the cumulative addition of the received signal.

What is claimed is:

1. A positioning method comprising:
   (a) adding cumulatively I components of a received signal of a positioning signal per polarity and adding cumulatively Q components of the received signal of the positioning signal per polarity, the positioning signal being spread-modulated with a spread code reversed in polarity by navigation data;
   (b) calculating sum of squares of the results of the cumulative addition in step (a);
   (c) calculating correlation between the sum of squares calculated in step (b) and a replica code of the spread code; and
   (d) executing a predetermined positioning calculation based on the result of the correlation calculation in step (c) to perform positioning of the present location.

2. The positioning method according to claim 1, further comprising:
   (e) estimating a polarity reversal timing and polarity by comparing time-series data of the received signal with time-series data of the navigation data of the positioning signal and determining a matching part of the polarity reversal timing in the navigation data,
   wherein in step (a), the I components of the received signal are cumulatively added per polarity in accordance with the estimated polarity reversal timing and polarity, and
   in step (a), the Q components of the received signal are cumulatively added per polarity in accordance with the estimated polarity reversal timing and polarity.

3. The positioning method according to claim 1, further comprising:
   (f) selecting a common data part common to the navigation data of different positioning signals; and
   (g) estimating a polarity reversal timing and polarity by comparing time-series data of the received signal with the common data and determining a matching part of the polarity reversal timing in the common data,
   wherein in step (a), the I components of the received signal are cumulatively added per polarity in accordance with the estimated polarity reversal timing and polarity,
   in step (a), the Q components of the received signal are cumulatively added per polarity in accordance with the estimated polarity reversal timing and polarity.

4. The positioning method according to claim 1, further comprising:
   (h) estimating, in the case in which the navigation data corresponding to the positioning signal has been acquired, a polarity reversal timing and polarity by comparing time-series data of the received signal with time-series data of the navigation data of the positioning signal and determining a matching part of the polarity reversal timing in the navigation data,
   (f) selecting a common data part common to the navigation data of different positioning signals; and
   (i) estimating, in the case in which the navigation data corresponding to the positioning signal has not been acquired, a polarity reversal timing and polarity by comparing time-series data of the received signal with the common data and determining a matching part of the polarity reversal timing in the common data,
   wherein in step (a), the I components of the received signal are cumulatively added separately by the polarity in accordance with the polarity reversal timing and the polarity estimated, and
   in step (a), the Q components of the received signal are cumulatively added separately per polarity in accordance with the estimated polarity reversal timing and polarity.

5. The positioning method according to claim 2, further comprising:
   (j) adding cumulatively the I components regardless of the polarity, and adding cumulatively the Q components regardless of the polarity;
   wherein in the case in which the estimation of the polarity reversal timing is unsuccessful in step (e), step (j) is executed instead of step (a).

6. The positioning method according to claim 5, wherein
   in the case in which the estimation of the polarity reversal timing is successful in step (e), step (a) is executed for a first cumulative addition time, and
   in the case in which the estimation of the polarity reversal timing is unsuccessful in step (e), step (j) is executed for a second cumulative addition time shorter than the first cumulative addition time.

7. A non-transitory computer-readable medium storing a program that makes a computer incorporated in a positioning device to execute a positioning method comprising:
   (a) adding cumulatively an I components of a received signal of a positioning signal per polarity and adding cumulatively Q components of the received signal of the positioning signal per polarity, the positioning signal being spread-modulated with a spread code reversed in polarity by navigation data;
   (b) calculating sum of squares of the results of the cumulative addition in step (a);
   (c) calculating correlation between the sum of squares calculated in step (b) and a replica code of the spread code; and
   (d) executing a predetermined positioning calculation based on the result of the correlation calculation in step (c) to perform positioning of the present location.

8. A positioning device comprising:
   a central processing unit (CPU) adapted to add cumulatively I components of a received signal of a positioning signal separately by the polarity and add cumulatively Q components of the received signal of the positioning signal separately by the polarity, the positioning signal being spread-modulated with a spread code reversed in polarity by a navigation data;
   a calculation section adapted to calculate sum of squares of the results of the cumulative addition by the cumulative addition section; and
   a correlation calculation section adapted to execute correlation calculation of the sum of squares calculated by the calculation section with a replica code of the spread code;
   the CPU adapted to execute predetermined positioning calculation based on the result of the correlation calculation by the correlation calculation section to perform positioning of the present location.

* * * * *

UNITED STATES PATENT AND TRADEMARK OFFICE
CERTIFICATE OF CORRECTION

PATENT NO. : 8,125,383 B2  Page 1 of 1
APPLICATION NO. : 12/352091
DATED : February 28, 2012
INVENTOR(S) : Terashima et al.

It is certified that error appears in the above-identified patent and that said Letters Patent is hereby corrected as shown below:

On title page, please add:

Item -- (30)   Foreign Application Priority Data

January 18, 2008   (JP) .................. 2008-008723 --

Signed and Sealed this
Fifth Day of June, 2012

David J. Kappos
*Director of the United States Patent and Trademark Office*